(12) United States Patent
Gollan

(10) Patent No.: US 9,978,051 B2
(45) Date of Patent: May 22, 2018

(54) METHODS AND SYSTEMS FOR FACILITATING PAYMENT TRANSACTION RECONCILIATION

(71) Applicant: Melissa Linda Gollan, Gisborne (NZ)

(72) Inventor: Melissa Linda Gollan, Gisborne (NZ)

( * ) Notice: Subject to any disclaimer, the term of this patent is extended or adjusted under 35 U.S.C. 154(b) by 0 days. days.

(21) Appl. No.: 14/774,099

(22) PCT Filed: Mar. 10, 2014

(86) PCT No.: PCT/NZ2014/000032
§ 371 (c)(1),
(2) Date: Sep. 9, 2015

(87) PCT Pub. No.: WO2014/142673
PCT Pub. Date: Sep. 18, 2014

(65) Prior Publication Data
US 2016/0019519 A1    Jan. 21, 2016

(30) Foreign Application Priority Data
Mar. 10, 2013   (NZ) ........................................ 602339

(51) Int. Cl.
| | | |
|---|---|---|
| *G06Q 30/00* | (2012.01) | |
| *G06Q 20/32* | (2012.01) | |
| *G06Q 20/22* | (2012.01) | |
| *G06Q 40/00* | (2012.01) | |
| *G06Q 20/20* | (2012.01) | |

(52) U.S. Cl.
CPC ........... *G06Q 20/22* (2013.01); *G06Q 20/202* (2013.01); *G06Q 20/209* (2013.01); *G06Q 20/322* (2013.01); *G06Q 40/00* (2013.01); *G06Q 40/12* (2013.12)

(58) Field of Classification Search
CPC ......... G06Q 30/06; G06Q 20/00; G06Q 20/32
USPC ......................................... 705/19, 14.23, 44
See application file for complete search history.

(56) References Cited

U.S. PATENT DOCUMENTS

| | | | |
|---|---|---|---|
| 5,093,787 A | 3/1992 | Simmons | |
| 7,302,408 B2 | 11/2007 | Engdahl et al. | |
| 8,121,941 B2 | 2/2012 | Matthews | |
| 8,596,527 B2 * | 12/2013 | Bishop | G06Q 20/02 235/379 |
| 8,615,457 B2 * | 12/2013 | Mullen | G06Q 20/02 235/380 |

(Continued)

FOREIGN PATENT DOCUMENTS

| | | |
|---|---|---|
| WO | WO 2002025606 | 3/2002 |

OTHER PUBLICATIONS

International Search Report for PCT/NZ2014/000032, dated May 2, 2014.

*Primary Examiner* — Oluseye Iwarere
(74) *Attorney, Agent, or Firm* — Moore & Van Allen PLLC; Patrick B. Horne

(57) ABSTRACT

A method for facilitating payment transaction reconciliation is provided. The method includes receiving a purchasing entity identifier at a point of sale. Payment transaction information associated with the purchase, and the purchasing entity identifier, are transmitted to a financial institution providing the payment service used to make the purchase. Merchant transaction information is also transmitted to the financial institution, with the purchasing entity identifier, to be recorded against the payment transaction information.

11 Claims, 3 Drawing Sheets

(56) References Cited

U.S. PATENT DOCUMENTS

| | | |
|---|---|---|
| 2004/0225567 A1 | 11/2004 | Mitchell et al. |
| 2008/0021821 A1 | 1/2008 | Katyal et al. |
| 2009/0112658 A1* | 4/2009 | Mullen .................. G06Q 20/10 705/39 |
| 2009/0112662 A1* | 4/2009 | Mullen .................. G06Q 20/02 705/35 |
| 2009/0164326 A1* | 6/2009 | Bishop .................. G06Q 20/02 705/19 |
| 2009/0164327 A1* | 6/2009 | Bishop .................. G06Q 20/02 705/19 |
| 2009/0164328 A1* | 6/2009 | Bishop .................. G06Q 20/02 705/19 |
| 2009/0164331 A1* | 6/2009 | Bishop .................. G06Q 20/02 705/19 |
| 2009/0265241 A1* | 10/2009 | Bishop .................. G06Q 20/02 705/14.38 |
| 2009/0265249 A1* | 10/2009 | Bishop .................. G06Q 20/02 705/21 |
| 2009/0265250 A1* | 10/2009 | Bishop .................. G06Q 20/02 705/21 |
| 2009/0271277 A1* | 10/2009 | Bishop .................. G06Q 20/02 705/21 |
| 2009/0271278 A1* | 10/2009 | Bishop .................. G06Q 20/02 705/21 |
| 2009/0287564 A1* | 11/2009 | Bishop .................. G06Q 20/02 705/14.38 |
| 2009/0287565 A1* | 11/2009 | Bishop .................. G06Q 20/02 705/14.38 |
| 2010/0138324 A1 | 6/2010 | Allen |
| 2012/0253906 A1* | 10/2012 | Lapica .................. G06Q 30/00 705/14.23 |
| 2012/0284130 A1* | 11/2012 | Lewis .................... G06Q 40/00 705/16 |
| 2013/0073365 A1* | 3/2013 | McCarthy ............. G06Q 20/02 705/14.23 |
| 2013/0151384 A1* | 6/2013 | Mullen .................. G06Q 20/02 705/30 |
| 2014/0019358 A1* | 1/2014 | Priebatsch ........... G06Q 20/322 705/44 |
| 2014/0067677 A1* | 3/2014 | Ali ........................ G06Q 20/02 705/44 |
| 2015/0095174 A1* | 4/2015 | Dua ....................... G06Q 20/20 705/21 |
| 2016/0117656 A1* | 4/2016 | Xu ......................... G06Q 20/14 705/34 |

* cited by examiner

ABSTRACT# METHODS AND SYSTEMS FOR FACILITATING PAYMENT TRANSACTION RECONCILIATION

STATEMENT OF CORRESPONDING APPLICATIONS

This application is based on the Provisional specification filed in relation to New Zealand Patent Application Number 602339, the entire contents of which are incorporated herein by reference.

TECHNICAL FIELD

The invention relates to methods and systems for facilitating reconciliation of electronic payment transactions.

BACKGROUND

While electronic point of sale systems have been widely adopted, there remain aspects which are less than ideal in terms of convenience to users.

For example, while payment details of the electronic retail transaction are recorded on a bank statement, numerous other details are not. When purchasing goods or services on behalf of an employer or business, the purchaser must retain the vendor produced receipt for proof of purchase, product or service information, and tax details.

This receipt is generally kept by the purchaser for the duration of a month, and then General Ledger coded by the purchaser and reconciled in chronological order to the relevant bank statement, then submitted for scrutiny and tax purposes to their manager or business accounts person, who then passes this to the business accountant for annual returns processing.

In New Zealand, the Goods and Sales Tax component of each individual receipt is then entered into that particularly businesses accounting system then filed for seven years as per the current New Zealand Inland Revenue Department laws.

This process is time consuming. Further, the physical receipts are susceptible to becoming damaged, or deteriorating to the point of becoming illegible.

It is an object of the present invention to address the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

DISCLOSURE OF THE INVENTION

According to an exemplary embodiment of the present invention there is provided a method for facilitating payment transaction reconciliation, including:
  receiving a purchasing entity identifier at a point of sale;
  transmitting payment transaction information associated with the purchase, and the purchasing entity identifier, to a financial institution providing the payment service used to make the purchase; and
  transmitting merchant transaction information to the financial institution, with the purchasing entity identifier, to be recorded against the payment transaction information.

According to an exemplary embodiment there is provided a computer system including at least one processor configured to:
  receive a purchasing entity identifier at a point of sale;
  transmit payment transaction information associated with the purchase, and the purchasing entity identifier, to a financial institution providing the payment service used to make the purchase; and
  transmit merchant transaction information to the financial institution, with the purchasing entity identifier, to be recorded against the payment transaction information.

According to another exemplary of the present invention there is provided an article of manufacture having computer storage medium storing computer readable program code executable by a computer to implement a method for facilitating payment transaction reconciliation, the code including:
  computer readable program code receiving a purchasing entity identifier at a point of sale;
  computer readable program code transmitting payment transaction information associated with the purchase, and the purchasing entity identifier, to a financial institution providing the payment service used to make the purchase; and
  computer readable program code transmitting merchant transaction information to the financial institution, with the purchasing entity identifier, to be recorded against the payment transaction information.

Reference to payment transaction information should be understood to mean information pertaining to the transaction between the merchant and financial institution on behalf of the purchaser—i.e. the transfer of funds between the accounts of the purchaser and merchant. This may include, for example, the total value of the purchase to be remitted, the date, the account from which payment is to be made, and an identifier of the merchant from which the purchase was made.

Merchant transaction information should be understood to mean information pertaining to the goods and/or services, for example the amount charged without tax, the tax component, a description of the goods and/or services supplied, the quantity or volume of supply—essentially any detail of the transaction which may be desired by the purchaser for accounting purposes but not required by the financial institution to complete the transaction.

It is envisaged that a unique transaction identifier may be generated at the time of the transaction, and included with the transmission of both the payment transaction information and the merchant transaction information to assist with reconciliation. It should be appreciated that this is not intended to be limiting, as reconciliation may be achieved using the information itself—for example using time, date, merchant details, value of transaction, and so on.

In an embodiment, transmitting the merchant transaction information may include the intermediary step of transmitting the information, and the purchasing entity identifier, to a reconciliation facilitation service.

Electronic point of sale (POS) systems are well established, and it is anticipated that it may be challenging to modify legacy systems to achieve the functionality described in a single line interaction between the point of sale and financial institution. By providing an intermediary reconciliation facilitation service, the barriers to entry may be reduced.

For example, the reconciliation facilitation service may take the form of a processing device executing set of computer executable instructions, such as an application installed on a user device, which receives the merchant transaction information from the point of sale and interacts with the systems of the financial institution to supply this information for reconciliation against the payment transaction information transmitted over the electronic point of sale network. It is envisaged that this arrangement may be particularly applicable where the user device has contactless payment capability—for example via Near Field Communication (NFC).

In another embodiment, the reconciliation facilitation service may be provided on a central server—providing a degree of separation between the financial institution(s) and other entities. This may be useful for a number of reasons, including security, and also enabling changes and additions to the service on the server/POS side to be isolated from the interface with the financial institution for security purposes.

The purchasing entity identifier may be created and transferred between devices using any suitable means known in the art. For example, payment card numbers are well known for identifying a card, which may be electronically associated with the issuing organization and user accounts. Other examples of means for identifying the purchasing entity include RFID tags, barcodes, swipe cards, and so on. In embodiments in which NFC is used to effect the transaction, the identifier may be included in the communication.

On receiving the payment transaction information and the merchant transaction information, the two sets of information may be reconciled and stored on the purchasing entity's account. The information may then be displayed in any suitable way known to those skilled in the art. It is envisaged that this may take the form of a statement, with columns for the data desired by the purchasing entity. For example, the statement may include: date of transaction, merchant particulars, merchant tax number (for example, GST number in New Zealand), general ledger code, debit/credit, tax, and balance.

In exemplary embodiments, the payment transaction information and the merchant transaction information may be used to generate a visual representation of a receipt for the purchase, including written characters such as numbers and letters. For example, one or more receipt templates may be maintained, and populated with the desired data on request. It is envisaged that this may be displayed in virtual documents on receiving selection of an entry in a ledger or statement, or an icon associated with that entry.

According to an aspect of the present invention there is provided a method of linking a customisable user code to a purchase made using an electronic point of sale terminal, including:
  receiving entry of a customisable user code at the time of making the purchase using the point of sale terminal; and
  transmitting the customisable user code with information associated with the purchase.

The customisable user code may be any indicia, likely a combination of numbers and/or letters, which the user wishes to use to identify or categorise the purchase. For example, the user code may be a general ledger code, a client identification number, a job number, a name, or any other desired identifier.

By enabling these to be generated and associated with a purchase at the time of purchase, the user code may be reconciled with the payment and/or merchant transaction information as generally discussed above. It should be appreciated that the code may be incorporated into the payment and/or merchant transaction information for transmission to the financial institution or reconciliation facilitation service.

In an embodiment, the user code may be entered to the point of sale terminal using any suitable means for entering numerals and/or letters known to a person skilled in the art. In an embodiment, the user code may be entered via a hardware or software based user interface on the terminal itself. For example, the user code may be entered as part of a point of sale authorisation process, such as entering a PIN, as known in the art. In another embodiment the user code may be entered via an intermediary device—for example a user device interfacing with the point of sale terminal.

It should be appreciated that where the user code is entered at a user device interfacing with the point of sale terminal, the code may not be transmitted to or via the point of sale terminal but via the user device itself.

It is envisaged that where the purchaser utilises a payment card—for example a credit or debit card—the financial institution responsible for issuance of the card may maintain a record of common user codes for individual clients, and issue cards with user code guides printed on them.

While embodiments of the invention may be used in a number of accounting practices, it is envisaged that one exemplary embodiment may have particular application to livestock sale reconciliation. Currently, farmers who purchase livestock at sales must retain proof of purchase identifying the animals they purchased and number thereof. This information is then reconciled on their bank statements for accounting purposes. If at time of purchase they were able to list this information alongside the financial transaction this may improve efficiency and improve the quality of record keeping for themselves and their business accountants.

According to one aspect of the present invention there is provided a method for payment transaction reconciliation for the purchase of livestock, including:
  receiving a purchasing entity identifier at a point of sale;
  transmitting payment transaction information associated with the purchase, and the purchasing entity identifier, to a financial institution providing the payment service used to make the purchase;
  transmitting livestock information to the financial institution, with the purchasing entity identifier, to be recorded against the payment transaction information.

The livestock information may be entered into the system, for example, by scanning identification tags of the animals, or manual entry of animal identification numbers. As described above in relation to user codes, this may be performed using the point of sale terminal or a peripheral attached thereto, or a user device interfacing with the terminal.

According to an aspect of the present invention there is provided a method for symbolically representing information associated with a purchase made using an electronic point of sale terminal, including:

receiving information associated with the purchase;
encoding the information into a barcode; and
displaying the barcode in a document.

Reference to a barcode should be understood to mean an optical machine-readable representation of data. The techniques for the generation of such barcodes are well known to those skilled in the art. In particular, it is envisaged that the barcode may include a two-dimensional matrix—for example a matrix barcode such as a QR™ code—but this should not be seen as limiting.

It should be appreciated that information may be the payment and/or merchant transaction information as generally discussed above. The barcode may effectively represent a digital receipt of the purchase transaction, which may be scanned (for example, via image recognition or traversal using an electromagnetic beam) to obtain the data. In an embodiment, the data may be used to generate a visual representation of a receipt including written characters such as numbers and letters.

According to an aspect of the present invention there is provided a method for obtaining information from a symbolic representation of information associated with a purchase made using an electronic point of sale terminal, including:

scanning a barcode encoded with information associated with the purchase; and
ecoding the barcode to extract the information.

In an embodiment, the extracted information may be used to generate a visual representation of a receipt including written characters—as previously discussed.

For a firmware and/or software (also known as a computer program) implementation, the techniques of the present invention may be implemented as instructions (for example, procedures, functions, and so on) that perform the functions described. It should be appreciated that the present invention is not described with reference to any particular programming languages, and that a variety of programming languages could be used to implement the present invention. The firmware and/or software codes may be stored in a memory, or embodied in any other processor readable medium, and executed by a processor or processors. The memory may be implemented within the processor or external to the processor.

A general purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers and network connections as known in the art.

The steps of a method, process, or algorithm described in connection with the present invention may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

BRIEF DESCRIPTION OF THE DRAWINGS

Further aspects of the present invention will become apparent from the ensuing description which is given by way of example only and with reference to the accompanying drawings in which.

DETAILED DESCRIPTION

Figure 1:
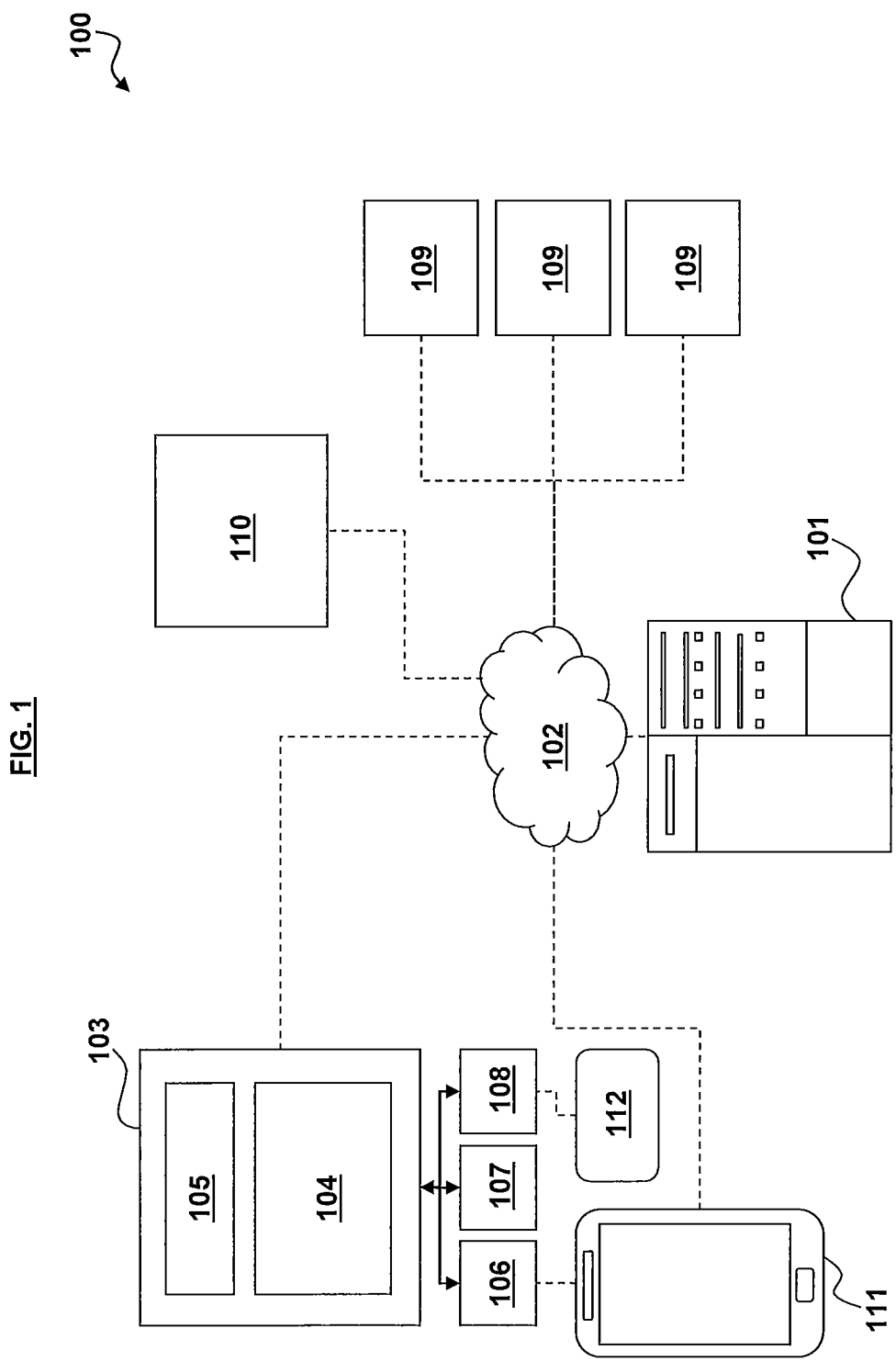
FIG. 1 is a block diagram illustrating an exemplary computer network system in which embodiments of the present invention may be employed.

FIG. 1 illustrates a computer network system 100 in which embodiments of the present invention may be implemented. The system 100 includes a reconciliation facilitation service having one or more servers 101 for receiving, processing, and responding to information obtained from various devices within the system 100 via a network 102. While the network 102 is illustrated as a single component, it should be appreciated that it may be composed of a number of sub-networks, potentially operating using distinct technologies—e.g. wired or wireless, fibre optic or radio. By way of example, the servers 101 could be web servers, application servers, database servers, or any other suitable type of server known in the art.

In particular, the server 101 may communicate with a point of sale (POS) terminal 103. The terminal 103 includes a memory 104 (which may include one or more computer readable storage mediums), one or more processing units (CPU's) 105, and connect to RF circuitry 106, POS user interface 107 (for example a screen and keypad—whether physical or softkeys), and an ID reader 108.

The one or more processors 105 run or execute various software programs and/or sets of instructions stored in memory 104 to perform various functions for the terminal 103 and to process data. Software components stored in memory 104 may include an operating system and various modules or applications for controlling operation of the terminal 103.

The POS terminal 103 may be used to pay a merchant for a product or service (a "purchase") using any known or later developed methods. For example, a purchaser may use a payment card with the POS user interface to identify an account from which the payment is to be remitted, and authorize payment via same. This may cause the POS terminal 103 to communicate over the network 102 with one or more servers of a financial institution (for example banks 109), whether directly or via an electronic transaction provider 110 (known in some jurisdictions as an "acquirer"), and provide payment transaction information relating to the transaction—such as a merchant identification, date of transaction, and value of same.

The POS terminal 103 may also communicate with the reconciliation facilitation service 101 to supply additional information relating to the transaction—for example merchant transaction information such as the amount charged without tax, the tax component, a description of the goods and/or services supplied, the quantity or volume of supply.

Alternatively, or in addition to direct communication with the reconciliation facilitation service server 101, the terminal 103 may communicate with a user device 111 via the RF circuitry 106. In an exemplary embodiment, the device 111 may be a smartphone having NFC capabilities. In exemplary embodiments, the user device 111 may take the place of the server 101 in interfacing with the financial institutions 109 to facilitate reconciliation of the payment transaction information and merchant transaction information.

Figure 2:
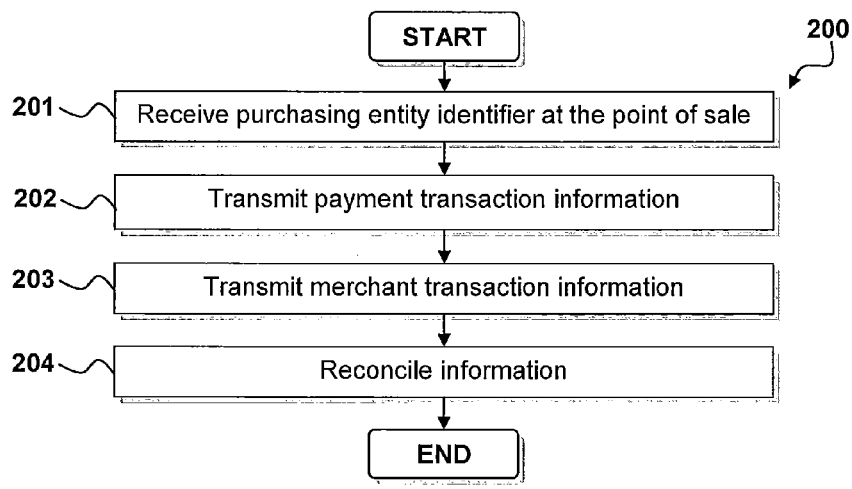
FIG. 2 is a flow diagram illustrating an exemplary method for payment transaction reconciliation in accordance with embodiments of the present invention.

FIG. 2 illustrates a method 200 for payment transaction reconciliation. The method 200 includes the step 201 of receiving a purchasing entity identifier at the point of sale 103. This may be acquired, for example, in the provision of authorisation of use of a payment card via interface 107, or via communication with user device 111. In another exemplary embodiment, the identifier may be obtained using ID reader 108, configured to read an identification device 112 of the purchaser—for example an RFID tag, unique barcode, or swipe card.

In step 202 the POS terminal 103 transmits payment transaction information associated with the purchase, and the purchasing entity identifier, to the financial institution 109 providing the payment service used to make the purchase.

In step 203 the POS terminal 103 transmits merchant transaction information to the financial institution 109, via reconciliation facilitation service 101 or user device 111, with the purchasing entity identifier, to be recorded against the payment transaction information. It should be appreciated that where the purchaser is identified by authorisation administered by financial institution 109, the purchasing entity identifier transmitted with the merchant transaction information may take another form (for example, that accessed with the RFID tag or swipe card) in order to maintain separation for security purposes. The identifiers may be linked within the institutions systems to assist with reconciliation.

In step 204, the financial institution receives the payment transaction information and the merchant transaction information, identifies the purchasing entity, and reconciles the two sets of information against the entity's account(s). The information may then be displayed in any suitable way known to those skilled in the art.

Figure 3:
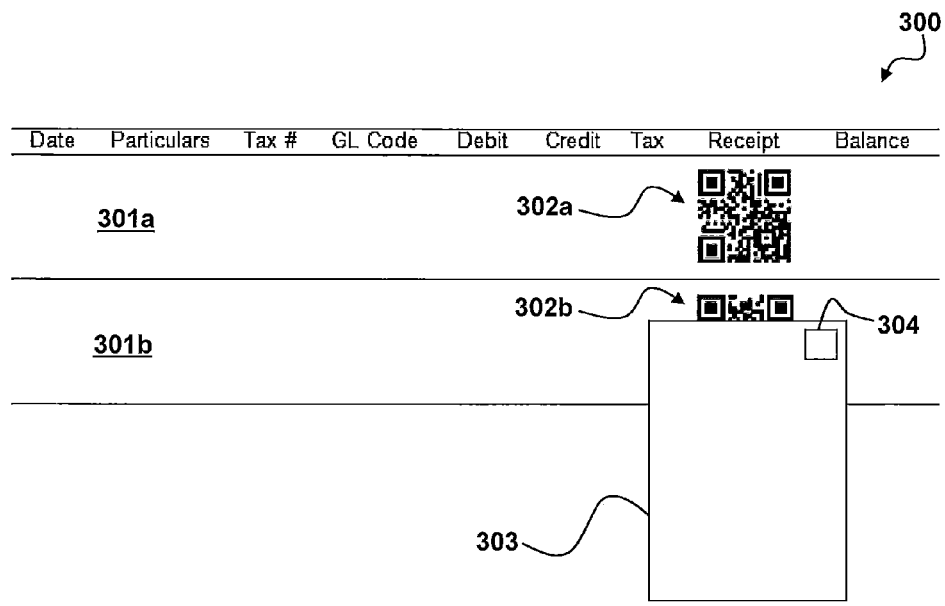
FIG. 3 is an exemplary document displaying reconciled payment data in accordance with embodiments of the present invention.

FIG. 3 illustrates an account statement 300 generated using the reconciled information, which may be displayed on any suitable display device. The statement 300 includes columns for the payment transaction information and the merchant transaction information desired by the purchasing entity. For example, the statement may include: date of transaction, merchant particulars, merchant tax number (for example, GST number in New Zealand), a customisable user code (for example a general ledger code), debit/credit, tax, and balance.

Within each line 301a, 301b of the statement 300a symbolic representation of the information may be provided—for example two-dimensional matrix barcodes 302a and 302b.

Figure 4:
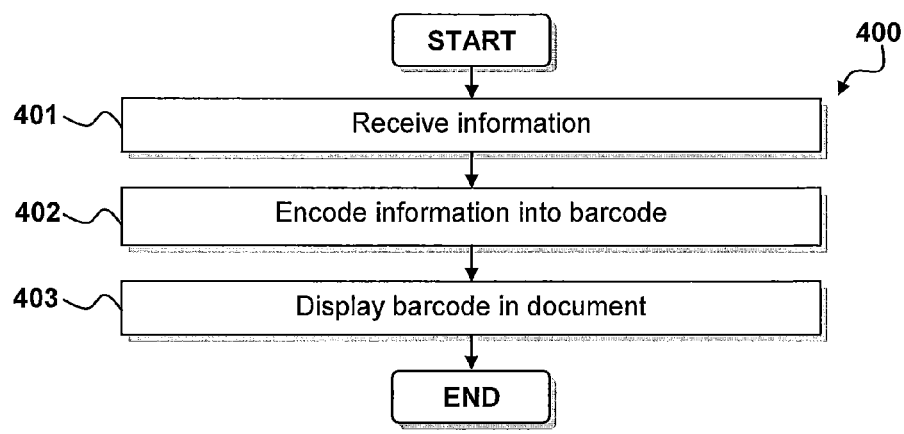
FIG. 4 is a flow diagram illustrating an exemplary method for generating a symbolisation of reconciled payment data in accordance with embodiments of the present invention.

FIG. 4 illustrates a method 400 by which matrix barcode 302a may be generated. In step 401 the information associated with the purchase is received—for example at the reconciliation facilitation service 101 or financial institution 109.

In step 402 the information is encoded into a barcode using any suitable encoding protocol known in the art. For example, the barcode may be a Quick Response Code—the encoding protocols of which are well known.

In step 403 the barcode 302a is displayed in a document—for example the statement 300 of FIG. 3. By providing the barcodes 302a and 302b on the statement 300, the data they contain may be readily obtained even if the statement 300 is printed or saved in a format in which the data is may be extracted. While Optical Character Recognition (OCR) could theoretically be used, this would require a knowledge of the layout of the statement 300, which may not be consistent between accounts of the purchasing entity.

Referring to FIG. 3, the service 101 or institution system 109 may be configured to generate a visual representation of a receipt 303 for the purchase, including written characters such as numbers and letters. One or more receipt templates may be maintained, and populated with the desired data on request—for example on selection of line 301b or barcode 302b an entry in a ledger or statement, or an icon associated with that entry.

The receipt 303 may include selectable options 304 for handling of the receipt 303—for example virtual or physical printing of the receipt.

Figure 5:
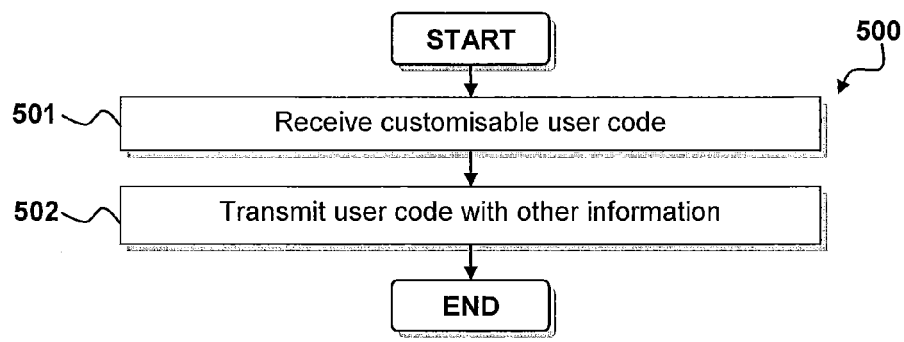
FIG. 5 is a flow diagram illustrating an exemplary method for linking a customisable user code to a purchase made using a POS terminal in accordance with embodiments of the present invention.

With regard to the customisable user code of the statement 300, FIG. 5 illustrates a method 500 for linking a customisable user code to a purchase made using POS terminal 103. In step 501, entry of a customisable user code at the time of making the purchase using the POS terminal 103 is received. For example, the user code may be a general ledger code, a client identification number, a job number, a name, or any other desired identifier.

In an exemplary embodiment, the code is received via user interface 107. For example following entry of an authorisation code required to process the transaction the user may be prompted to enter the customisable user code. In another embodiment, the user code may be entered in the same string of characters as the authorisation code, but distinguished using a marker character such as a hash symbol.

In step 502, the customisable user code is transmitted with information associated with the purchase. By enabling the user code to be generated and associated with a purchase at the time of purchase, the user code may be reconciled with the payment and/or merchant transaction information—for example as described with reference to FIG. 2.

Aspects of the present invention have been described by way of example only and it should be appreciated that modifications and additions may be made thereto without departing from the scope thereof as defined in the appended claims.

What I claim is:

1. A computer implemented method for facilitating payment transaction reconciliation, comprising:
   receiving, at a merchant's point of sale device: a purchasing entity identifier identifying an account from which payment is to be made for a purchase, and a customisable user code for the purchase from a user making the purchase;
   transmitting payment transaction information associated with the purchase over an electronic point of sale network to a financial institution providing the payment service used to make the purchase;

transmitting merchant transaction information, the purchasing entity identifier, and the customisable user code to a reconciliation facilitation service, the reconciliation facilitation service including a processing device executing a set of computer executable instructions; and interacting, between the reconciliation facilitation service and the financial institution to record the merchant transaction information, the purchasing entity identifier, and the customisable user code, against the payment transaction information.

2. A method as claimed in claim 1, wherein the payment transaction information comprises at least one of: total value of the purchase to be remitted, date of purchase, account details, and an identifier of a merchant from which the purchase was made.

3. A method as claimed in claim 1, wherein the merchant transaction information comprises at least one of: amount charged without tax, a tax component, a description of goods and/or services supplied, and quantity or volume of supply.

4. A method as claimed in claim 1, comprising the step of reconciling the payment transaction information and the merchant transaction information against an account of the purchasing entity associated with the purchasing entity identifier.

5. A method as claimed in claim 1, comprising using the payment transaction information and the merchant transaction information to generate a visual representation of a receipt for the purchase.

6. A method as claimed in claim 1, wherein the user code is entered via a user interface at the point of sale device.

7. A method as claimed in claim 1, wherein the user code is entered via an intermediary user device interfacing with the point of sale device.

8. A method as claimed in claim 1, comprising:
receiving the payment transaction information and the merchant transaction information;
encoding the information into a barcode; and
displaying the barcode in a document.

9. A method as claimed in claim 8, wherein the barcode comprises a two-dimensional matrix.

10. A method as claimed in claim 8, comprising:
scanning the barcode; and
decoding the barcode to extract the information.

11. A computer system comprising:
a reconciliation facilitation service comprising least one processor;
a merchant's point of sale device, comprising at least one processor configured to:
receive a purchasing entity identifier identifying an account from which payment is to be made for a purchase, and a customisable user code for the purchase from a user making the purchase;
transmit payment transaction information associated with the purchase over an electronic point of sale network to a financial institution providing the payment service used to make the purchase; and
transmit merchant transaction information, the purchasing entity identifier, and the customisable user code to the at least one processor of the reconciliation facilitation service,
wherein the at least one processor of the reconciliation facilitation service is configured to interact with the financial institution to record the merchant transaction information, the purchasing entity identifier, and the customisable user code, against the payment transaction information.

* * * * *